(12) United States Patent
Noguchi (10) Patent No.: US 6,175,473 B1
(45) Date of Patent: Jan. 16, 2001

(54) MAGNETIC HEAD IN WHICH A CORE ASSEMBLY IS MOUNTED ON A RAIL FORMED ON A SLIDER

(75) Inventor: Ichiro Noguchi, Niigata-ken (JP)

(73) Assignee: Alps Electric Co., Ltd., Tokyo (JP)

( * ) Notice: Under 35 U.S.C. 154(b), the term of this patent shall be extended for 0 days.

(21) Appl. No.: 09/205,519

(22) Filed: Dec. 3, 1998

(30) Foreign Application Priority Data

Dec. 4, 1997 (JP) .................................................. 9-334398

(51) Int. Cl.$^7$ ....................................................... G11B 5/60
(52) U.S. Cl. ................................... 360/234.9; 360/234.8; 360/121
(58) Field of Search ................................ 360/103, 235, 360/121, 234.8, 234.9

(56) References Cited

U.S. PATENT DOCUMENTS

| | | | |
|---|---|---|---|
| 4,933,795 | 6/1990 | Nigam | 360/121 |
| 5,041,936 | 8/1991 | Hayakawa | 360/121 |
| 5,148,342 | 9/1992 | Kato | 360/121 |
| 5,168,407 | * 12/1992 | Shimizu et al. | 360/103 |
| 5,181,150 | 1/1993 | Hayakawa et al. | 360/121 |
| 5,235,483 | 8/1993 | Hayakawa et al. | 360/103 |
| 5,251,089 | 10/1993 | Hara | 360/121 |
| 5,267,107 | * 11/1993 | Vadnais et al. | 360/103 |
| 5,276,578 | 1/1994 | Kato et al. | 360/122 |
| 5,305,166 | * 4/1994 | Inoue et al. | 360/103 |
| 5,485,332 | * 1/1996 | Egawa et al. | 360/103 |
| 5,546,251 | * 8/1996 | Egawa et al. | 360/103 |

FOREIGN PATENT DOCUMENTS

| | | |
|---|---|---|
| 3-125320 | * 5/1991 | (JP) . |
| 7-192241 | * 7/1995 | (JP) . |
| 8-263820 | * 10/1996 | (JP) . |
| 10-69625 | * 3/1998 | (JP) . |
| 11-149616 | * 6/1999 | (JP) . |

* cited by examiner

Primary Examiner—Jefferson Evans
(74) Attorney, Agent, or Firm—Brinks Hofer Gilson & Lione (57) ABSTRACT

A protruding rail portion is formed in the slider in a specific width. The core assembly in the specific width is fixed at the trailing side of the protruding rail portion. The ABS surface is formed in the specific width by the protruding rail portion and the core assembly. Since the ABS surface on the trailing side is formed only by the core assembly, the wear resistance is high and wearing is even. The assembling of the core assembly is simple because the core assembly can be set from the side direction of the slider.

15 Claims, 7 Drawing Sheets

MAGNETIC HEAD IN WHICH A CORE ASSEMBLY IS MOUNTED ON A RAIL FORMED ON A SLIDER

BACKGROUND OF THE INVENTION

1. Field of the Invention

The present invention relates to a magnetic head which is subjected to an air stream on a recording medium in a floating position or slides on a recording medium, and more particularly to a magnetic head in which a core assembly having a magnetic gap is mounted on a rail formed on a slider.

2. Description of the Related Art

In a magnetic head being subjected to an air stream on a recording medium in a floating position, a rail having a predetermined width is formed on opposing surfaces of a slider and a recording medium to form an ABS surface (air bearing surface) on the rail which is subjected to an air stream.

In a disk apparatus, for example, having a flexible disk for high density recording as a recording medium, on the rail surface of the slider, mentioned above, a core assembly formed by joining half-portions of the core across a magnetic gap is mounted thereon. For high density recording, because of a narrow track width, the width of the half-portion of the core forming the core assembly is sufficiently smaller than that of the rail forming the ABS surface.

Therefore, when the core assembly is mounted on the rail of the slider, a slot with a narrower width than that of the rail is to be formed in the rail of the slider to embed the core assembly therein.

The magnetic head of this configuration, however, presents problems as follows.

(1) As it is necessary to form a narrower slot in the rail of the slider than the width of the rail, it is very difficult to machine such a narrow slot, because the slider is as small as 3 mm on one side.

(2) As the core assembly is embedded in the narrow slot formed in the rail of the slider, it is difficult to position and secure the half-portion of the core in the narrow slot. Accordingly, in mounting the core, some problems may be encountered, such as deviation of an azimuth angle of a magnetic gap by inclined mounting of the half-portion of the core in the slot, difficulty in precise positioning of the magnetic gap, and difficulty in precise setting of the depth of the magnetic gap from the surface of the rail (gap depth).

(3) Since the slider and the half-portion of the core are made of materials that are different, their wearing states are different. When the slider is made of a ceramic of calcium titanate (Ti—O—Ca) and the half-portion of the core is made of ferrite, for example, the slider is prone to wear in comparison with the half-portion of the core. In the above-mentioned structure of the core assembly embedded in the surface of the rail with a narrower width than that of the rail, the wearing states differ in the surface of the rail and the half-portion of the core at the portion where the core assembly is mounted. This results in possibility of producing differences in level on the ABS surface (rail surface) in the width direction. The differences in level may affect the floating position of the slider on a recording medium and also may cause possible blemishes of the surface of the recording medium.

SUMMARY OF THE INVENTION

Accordingly, in order to solve the aforementioned problems, it is an object of the present invention to provide a magnetic head in which machining of the slider is easy when the core assembly is placed, and a magnetic gap of the core assembly can be precisely positioned and fixed to the slider, and differences in level in the width direction of the rail on the surface of the ABS can be prevented.

In one aspect of the present invention, a magnetic head comprises a slider; a rail extending in the scanning direction of a recording medium, formed in the slider; a core assembly formed by joining core half-portions which have the same width as that of the rail across a magnetic gap therebetween; and a coil which is placed in the core half-portion, wherein the core assembly is placed into the rail in a continuous position with the rail, and wherein the surface of the rail and the surfaces of the core half-portions are continuous and have the same width.

In the present invention, since the widths of the core half-portions of the core assembly and the rail are the same, a slot in the same width as that of the rail may be machined in the slider, which results in easy machining of the slot. The core assembly also can be easily positioned in the slider and a magnetic gap of the core assembly can be precisely positioned and fixed to the slider, preventing deviation of an azimuth angle.

Since the core assembly is formed in the same width as that of the rail, and the core half-portions of the core assembly form a portion of the rail, in the portion where the core assembly is placed, the rail is formed by only the core half-portions in the rail width direction. Therefore, wearing of the ABS surface around the magnetic gap may be even when sliding on a recording medium which prevents large differences in level in the ABS surface. Particularly, when the core assembly is placed on the trailing side of the slider and the rail in the trailing portion is formed by only the core assembly, the ABS surface which may slide with a recording medium, mostly in a CSS (contact start stop) system is formed by the core material. The wearing of the ABS surface on the trailing side can be prevented by using a wear resistant material as the core material.

In a second aspect of the present invention, a magnetic head comprises a slider; a rail extending in the scanning direction of a recording medium, formed in the side of the slider; a core assembly formed by joining core half-portions across a magnetic gap therebetween; and a coil which is placed in the core half-portion, wherein the core assembly is placed to the side face of the rail, and wherein the surface of the rail and the surfaces of the core half-portions are formed continuously with each other.

Assembling of the core half-portions in the slider may be simple because the core half-portions can be fixed to from the side direction of the slider. Machining of a slot in which the core assembly is fitted may be eliminated.

In this case, it is preferable that the core half-portions of the core assembly be formed in the same width as that of the rail, wherein in the slider, a concave portion is formed by cutting a notch in the rail in the width direction, wherein in the core assembly is placed into the concave portion, and wherein the surface of the rail and the surfaces of the core half-portions are formed continuously with each other in the same width.

In this configuration, the wearing of the surface of the rail by the sliding with a recording medium may be even; and a track-width of the magnetic gap of the core assembly may be shorter than the width of the rail according to the present invention.

A magnetic head may comprise an additional rail formed in the slider in parallel with the rail; and an additional core assembly having a magnetic gap with a larger track width than the track width of the core assembly, wherein at least a partial portion of the additional rail is formed by the additional core assembly.

In this configuration, since the surface of each rail is formed by the core half-portions, the wearing on the both rails is even, preventing differences in level in the ABS surface. The entire surface of the ABS will be wear resistant by forming the core half-portions by a wear-resistant material.

The present invention is not limited to a configuration in which the additional rail is formed by the additional core assembly as mentioned above, the additional rail may be formed by the material forming the slider in one piece.

BRIEF DESCRIPTION OF THE DRAWINGS

FIGS. 1A to 1C illustrate an Embodiment of the present invention, in which

FIGS. 4A and 4B illustrate another Embodiment of the present invention, in which

FIGS. 6A and 6B illustrate a modified Embodiment of the present invention, in which FIGS. 7A to 7C illustrate another modified Embodiment of the present invention, in which

DESCRIPTION OF THE PREFERRED EMBODIMENTS

Figure 1A:
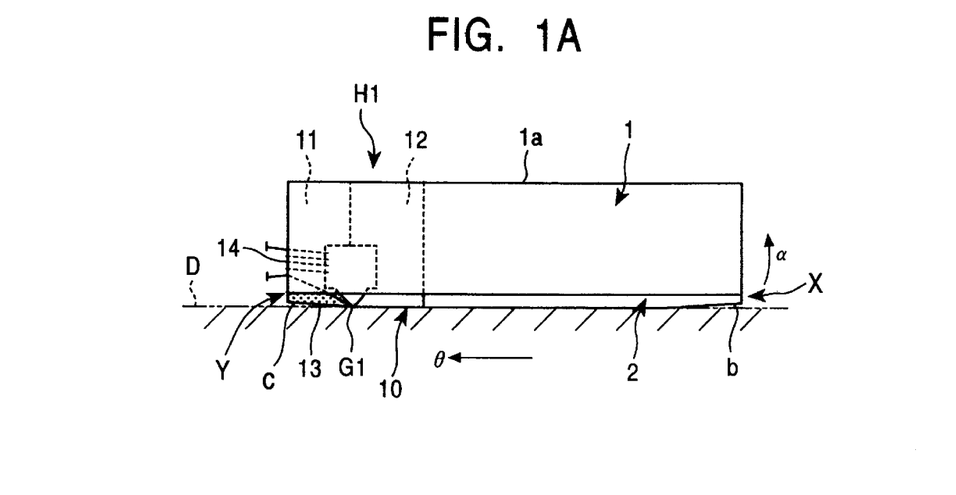
FIG. 1A is a side view of a magnetic head.
Figure 1B:
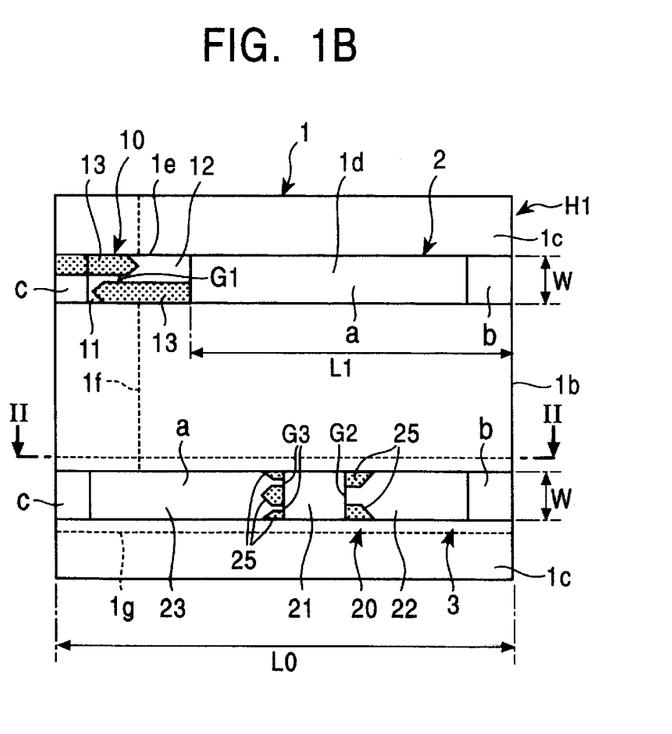
FIG. 1B is a bottom plan view.
Figure 1C:
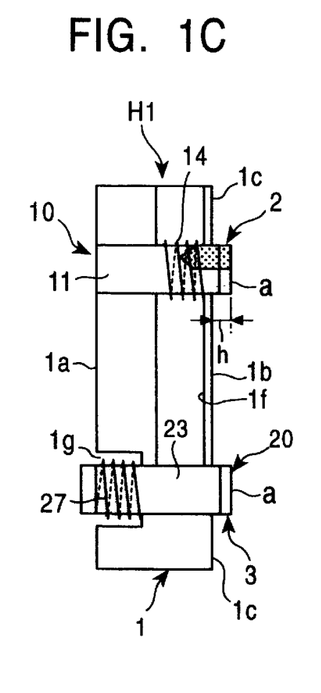
FIG. 1C is an end view at the trailing side.
Figure 2:
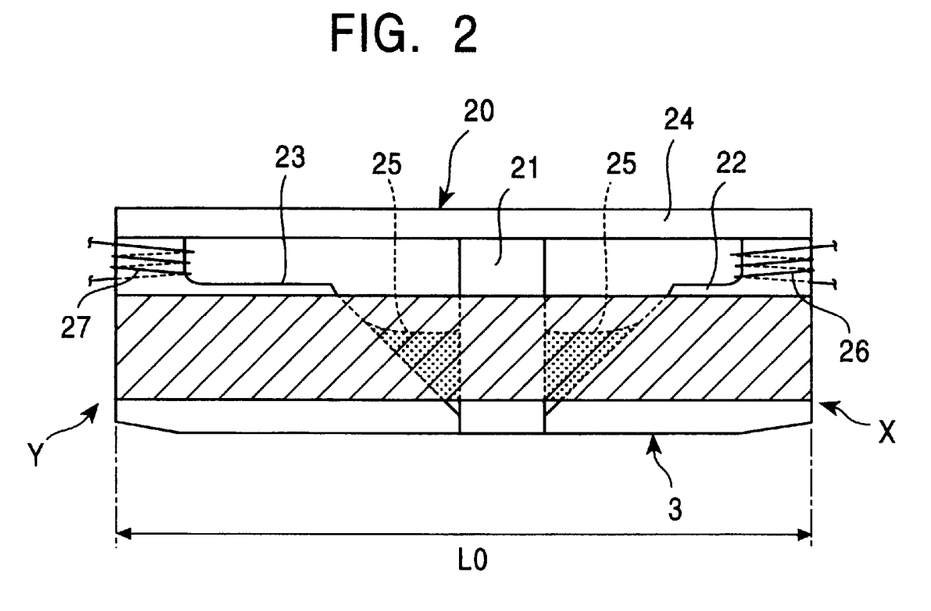
FIG. 2 is a cross-sectional view at the line II—II of FIG. 1B.
Figure 3:
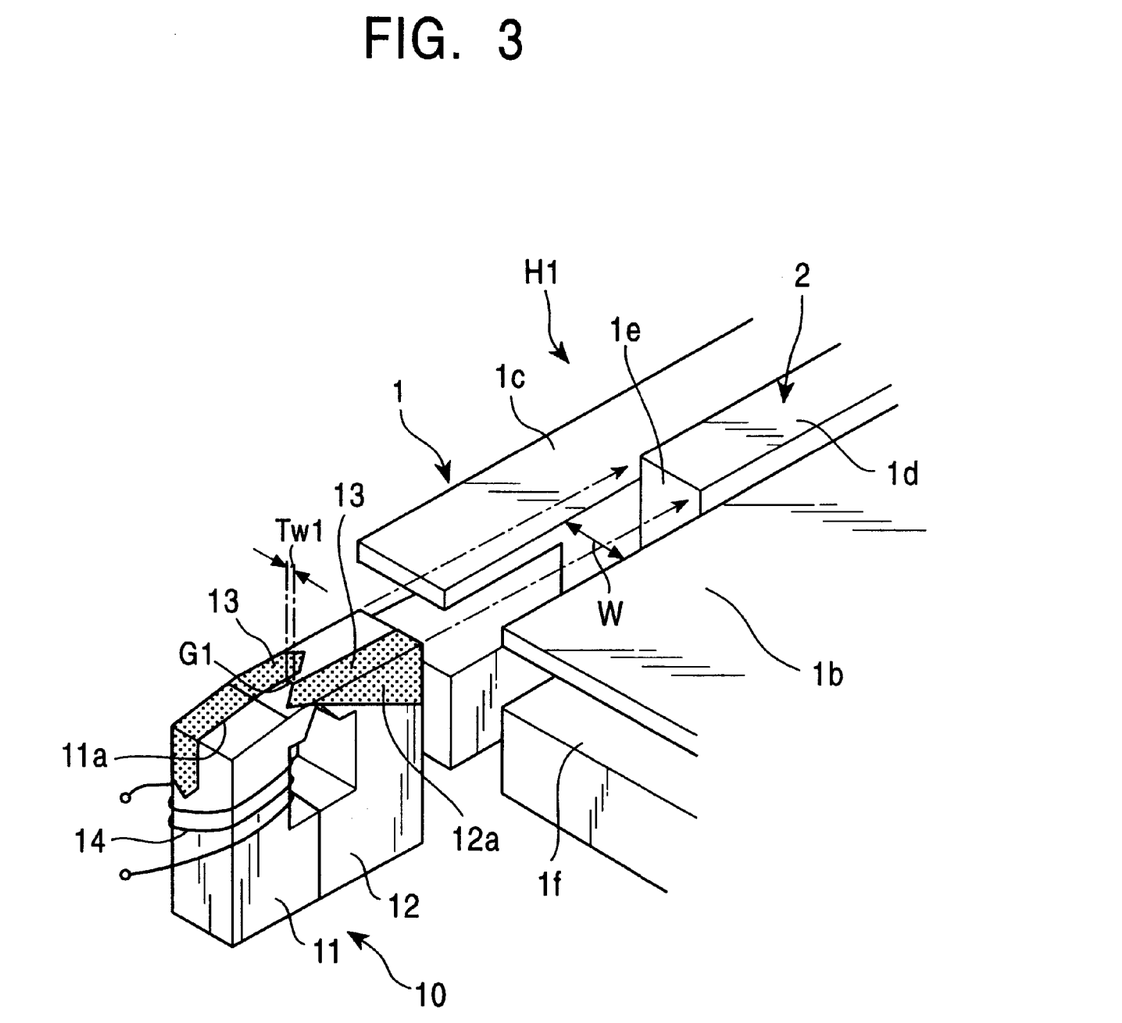
FIG. 3 is a partly exploded perspective view illustrating the trailing side of the magnetic head of FIGS. 1A to 1C with the ABS surface facing up.

FIGS. 1 to 3 show a magnetic head according to an Embodiment of the present invention. FIG. 1A is a side view illustrating the magnetic head sliding on a recording medium, FIG. 1B is a bottom plan view illustrating the magnetic head from opposing surfaces of the recording medium, and FIG. 1C is an end view at a trailing side. FIG. 2 is a cross-sectional view at the line II—II of FIG. 1B. FIG. 3 is a partly exploded perspective view showing mounting of the core assembly with a surface facing a recording medium facing up.

This magnetic head H1 enables a flexible disk for high-density recording as well as a flexible disk for low-density recording to be recorded and reproduced. The magnetic head H1 slides on a disk D, as shown in FIG. 1A, for a flexible disk for low-density recording while for a flexible disk for high-density recording, it is upwardly inclined in the direction α from the leading side X in a floating position receiving an air stream on a high-speed rotating disk in the direction θ. At this time, the magnetic head at the trailing side Y scans the disk D by floating or sliding lightly on the disk D.

The slider 1, made of a ceramic of calcium titanate (Ti—O—Ca) and the like, is resiliently supported by a gimbal (not shown) at the supporting surface 1a.

On the surface of the slider 1 opposing the recording medium (disk D), as shown in FIGS. B and C, rails 2 and 3 are formed at both sides in the width direction, along the traveling direction of the disk D, in parallel with each other. The surfaces of the rails 2 and 3 are each ABS surface (a) (air bearing surface). Between the rails 2 and 3 and outside thereof are formed grooves 1b, 1c and 1c, respectively which are a step lower than the ABS surface (a). The difference in level between the grooves 1b, 1c and 1c and the ABS surface (a) is h, being common to the rails 2 and 3.

On the other hand, the rail 2 is formed by a protruding rail portion 1d being integral with the slider 1 and extending from the leading side X part way to the trailing side Y in the length of L1. Between the protruding rail portion 1d and the trailing edge Y is formed a holding slot 1e which is cut away in the slider 1 in the thickness direction with an inside width of W. To this holding slot 1e, the core assembly 10 is fitted and fixed.

As shown in FIG. 3, the core assembly 10 is formed by joining the core half-portions 11 and 12, which are made of ferrite. In the core half-portion 11 is formed a track-width restricting groove 11a while in the core half-portion 12 is formed a track-width restricting groove 12a being symmetrical with the track-width restricting groove 11a. Therefore, in the junction between the core half-portions 11 and 12, a very narrow magnetic gap G1 for high density recording, having a width of TW1, is formed. The track-width restricting grooves 11a and 12a are filled with non-magnetic materials 13 and 13 such as glass. Around the core half-portion 11, a length of wire is wound into a coil 14.

The widths of both of the core half-portions 11 and 12 are W, while the width of the core assembly 10 is also W. Accordingly, when the core assembly 10 is held by the holding slot 1e of the slider 1, as shown in FIGS. 1B and 1C, the rail 2 is formed by the protruding rail portion 1d of the slider 1 and the core assembly 10 being continuous in the same width W and difference in level h. The surfaces of the protruding rail portion 1d and the core assembly 10 are continuously formed in the same width W to form the ABS surface (a).

At the edge surface of the trailing side Y of the slider 1, a concave portion 1f is formed in the width direction of the slider 1. After the core assembly 10, formed by joining the core half-portions 11 and 12, is fitted and cemented in the holding slot 1e, the wire can be wound around the core half-portion 11 into the coil 14 utilizing the internal space of the concave portion 1f.

The rail 3 is formed by a core assembly 20. As shown in FIGS. 1B and 2, the core assembly 20, having the same length L0 as that of the slider 1, is placed between and held by a slider portion forming a slot 1b and a slider portion forming a slot 1c.

The core assembly 20 is formed by a core for recording and reproducing 22 at the leading side X and a core for erasing 23 at the trailing side Y and a center core 21 which is connected to each of the former two cores. As shown in FIG. 1B, a magnetic gap for recording and reproducing G2 on the leading side X and a pair of magnetic gaps for erasing G3 on the trailing side Y are formed. The track-width restricting grooves formed at the core for recording and reproducing 22 and at the core for erasing 23 are filled by a non-magnetic material 25 such as glass. To the base portions of the center core 21, the core for recording and reproducing 22, and the core for erasing 23, a back core 24 is connected.

The width of each of the cores 21, 22 and 23 is W resulting in the width of the core assembly 20 being W. The rail 3 is formed by protrusion of the core assembly 20 by a height of h from the grooves 1b and 1c of the slider 1.

On the surface, opposite to that facing the recording medium in the slider 1, as shown in FIG. 1C, a concave portion 1g is formed on both sides of the core assembly 20 to form a space for wire-winding for the coil for recording and reproducing 26 of the core 22 and for the coil for erasing 27 of the core 23.

Inclined surfaces (b) and (b) are formed on the rails 2 and 3 at the leading side X while inclined surfaces (c) and (c) are formed at the trailing side Y.

The ABS surface (a) of the magnetic head H1 slides nearly sticking firmly on the surface of the disk D while the disk D is rotating at high speed, as shown in FIG. 1A, in the case in which the recording medium (disk D) is for low-density recording. At this time, storing and reading of a recording signal are performed by the gap for recording and reproducing G2 while signal residues at both sides of the track are erased by the pair of gaps for erasing G3 in the case of recording.

On the other hand, in the case in which the recording medium (disk D) is for high-density recording, the leading side X of the rail is upwardly inclined in the direction α in a floating position receiving an air stream on the high-speed rotating disk. At this time, storing and reading in a narrow width track are carried out by the magnetic gap G1 of the core assembly 10 at the trailing side Y.

In this magnetic head H1, the ABS surface (a) of the surface of the rail 3 is formed of the cores 21, 22 and 23 which form the core assembly 20, while the ABS surface (a) of the surface of the rail 2 at the trailing side Y is formed of the half-portions of the core 11 and 12 of the core assembly 10.

The ABS surfaces (rails 2 and 3) are formed of the cores made of ferrite, covering the overall width thereof, in the regions in which the core assemblies 10 and 20 are placed. Since ferrite has a higher wear resistance than calcium titanate, the ABS surface of the magnetic head H1 has a high wear resistance. In the rail 2, although the protruding rail portion 1d of the slider 1 is formed at the leading side X, since the frequency of sliding on the surface of the disk D is higher on the trailing side Y of the rail in the CSS system, overall wear of the rail can be reduced, because the ABS surface of the rail 2 is formed by the core assembly 10 at the trailing side Y.

Since the widths of the core assemblies 10 and 20 are the same as that W of the rail and the rail is not alternately formed by the core made of ferrite and the slider made of calcium titanate in the rail width direction, wearing of the ABS surface is even and differences in level at the ABS surface occur with difficulty. This results in the surface of the disk not being scratched by differences in level.

As shown in FIG. 3, since the internal width of the holding slot 1e in which the core assembly 10 is fitted is W and is comparatively broad, machining of the holding slot 1e is easy. The ABS surface cannot be damaged when machining the slot, which is different from the case of a narrow width slot being formed only in the center portion in the width direction of the rail.

Figure 4A:
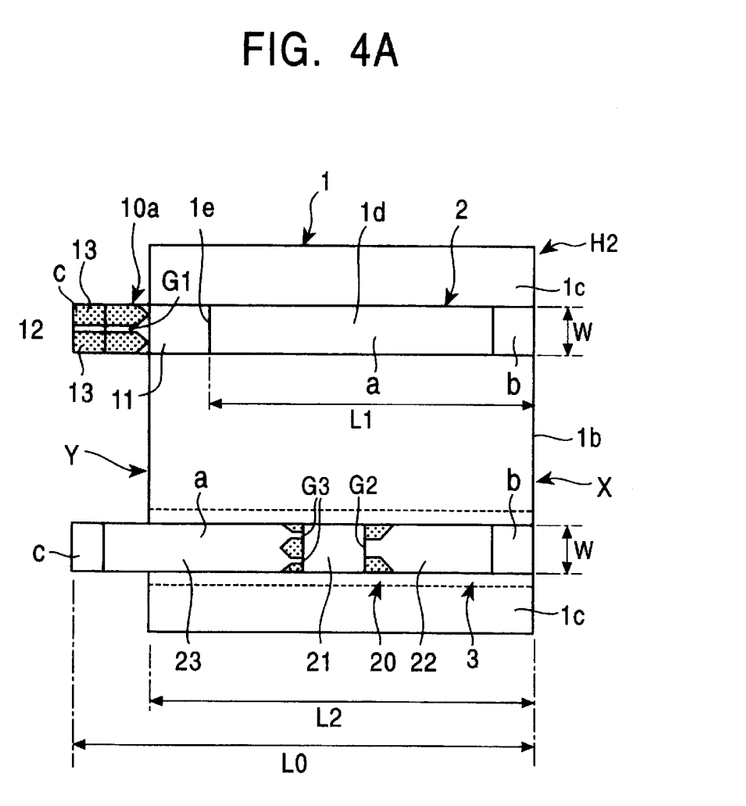
FIG. 4A is a bottom plan view of a magnetic head.
Figure 4B:
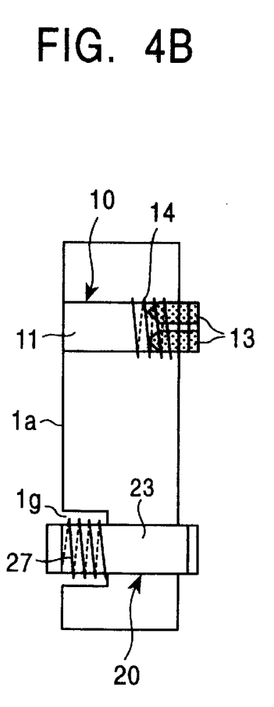
FIG. 4B is an end view at the trailing side thereof.
Figure 5:
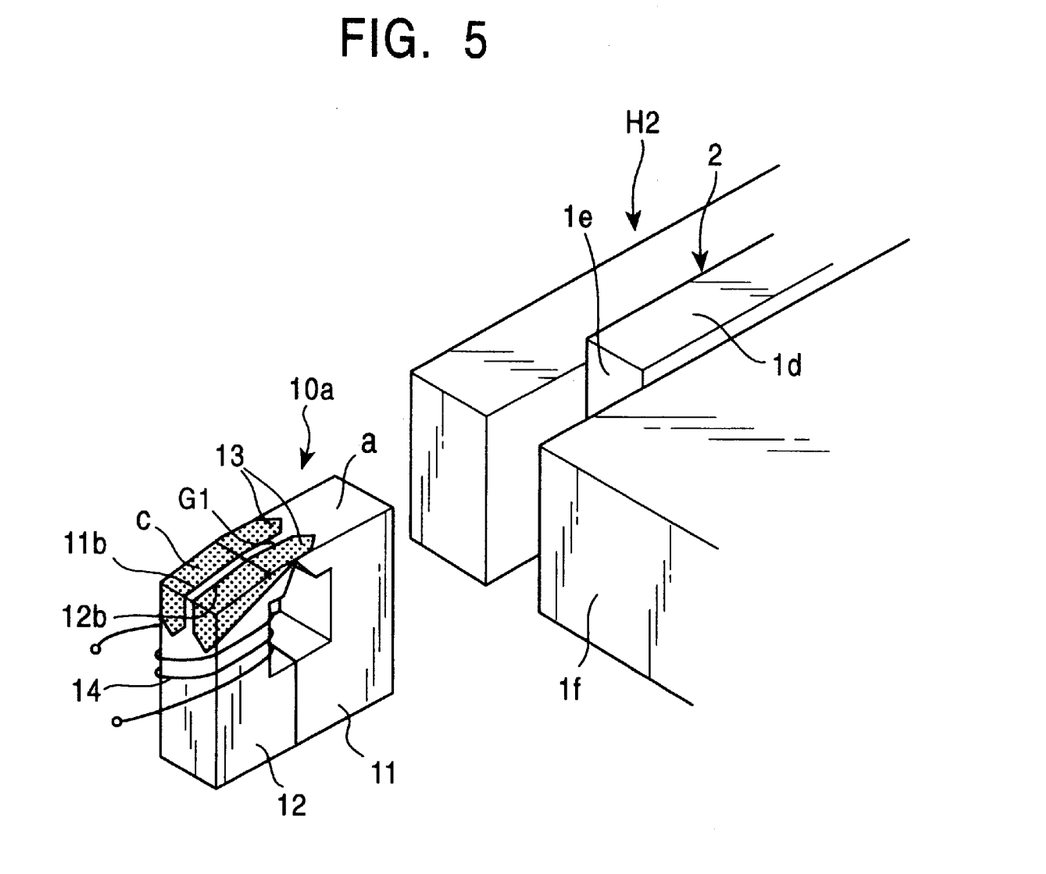
FIG. 5 is a partly exploded perspective view illustrating the trailing side of the magnetic head of FIG. 4 with the ABS surface facing up.

FIGS. 4A, 4B, and 5 illustrate another Embodiment of the present invention: FIG. 4A is a bottom plan view illustrating a magnetic head H2 viewed from the surface opposing a recording medium; FIG. 4B is an end view of the trailing side Y in FIG. 4A; FIG. 5 is a partly exploded perspective view illustrating the trailing side Y of the magnetic head with the surface opposing the recording medium facing up.

The magnetic head H2 shown in FIGS. 4A, 4B, and 5 is shorter in length in the scanning direction of the disk D than that of the magnetic head H1 shown in FIGS. 1A to 3, and is also different in the structure of the core assembly 10a.

First, the overall length L2 of the slider 1 is shorter than the overall length L0 of the slider 1 shown in FIG. 1B, and (L0–L2) is approximately the same as the depth of the concave portion 1f formed at the edge surface on the trailing side Y of the slider 1 shown in FIGS. 1A to 1C. However, the length of the rail 2, with a width W, formed of the protruding portion 1d of the slider 1 and of the following core assembly 10a, and the length of the rail 3, with width being the same W, formed by the core assembly 20 are the same as the overall length L0 of the slider 1 of the magnetic head H1 shown in FIG. 1B. Accordingly, on the trailing side Y of the magnetic head H2, the core assembly 10a and the core assembly 20 are protruded from the slider 1.

In the magnetic head H2, since the core half-portion 11 of the core assembly 10a and the core for erasing 23 of the core assembly 20 are protruded from the slider 1, the coil 14 and the coil for erasing 27 can be easily wound around the core half-portion 11 and the core for erasing 23, respectively.

As shown in FIGS. 4A to 5, the core assembly 10a is formed by joining the core half-portions 11 and 12 which are made of ferrite. A track-width restricting groove 11b of the core half-portion 11 and a track-width restricting groove 12b of the core half-portion 12 are formed together at the end portion on the trailing side Y being symmetrical with respect to the width direction. This results in forming a magnetic gap G1 having the same track width TW1 as shown in FIG. 3. The coil 14 is wound around the core half-portion 11.

In the core assembly 10a formed at the edge portion of the rail 2 on the trailing side Y, non-magnetic materials 13 and 13 such as glass filled in the track-width restricting grooves 11b and 12b, and the center core half-portion forming the track width Tw1 are placed being symmetrical with the width direction. Therefore, wearing in the ABS surface (a) and the inclined surface (c) formed by the core assembly 10 will be even in the width direction.

Figure 6A:
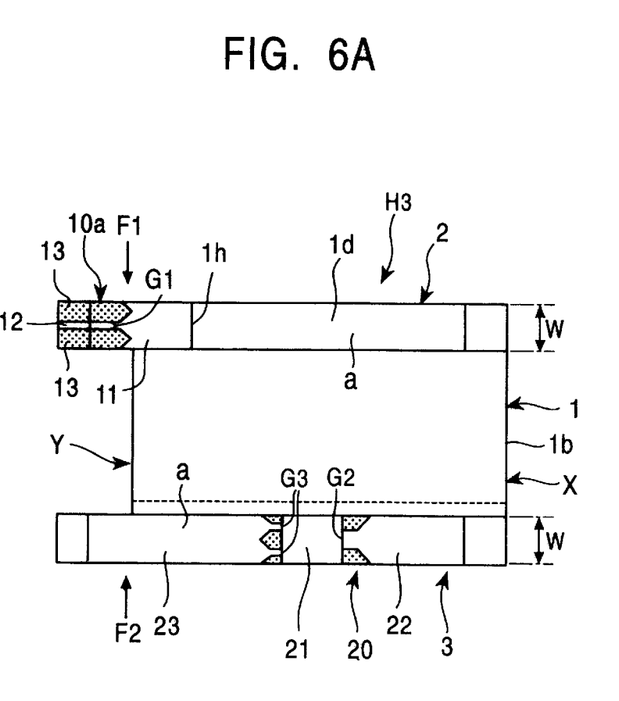
FIG. 6A is a bottom plan view of the magnetic head.
Figure 6B:
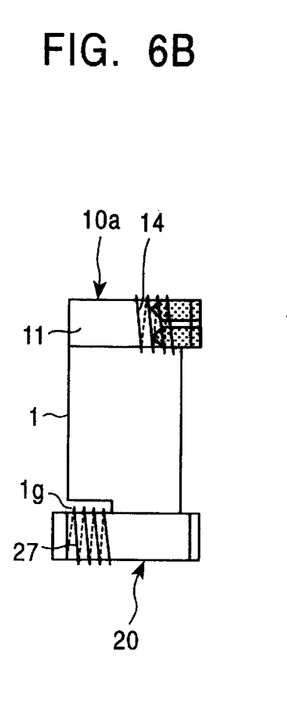
FIG. 6B is an end view at the trailing side thereof.

FIGS. 6A and 6B illustrate a modified Embodiment of the Embodiment shown in FIG. 4. FIG. 6A is a bottom plan view showing a magnetic head H3 viewed from the surface opposing a recording medium; and FIG. 6B is an end view viewed from the trailing side Y.

The magnetic head H3, shown in FIGS. 6A and 6B, is formed in the same shape as the magnetic head H2 shown in FIG. 4, except that grooves 1c and 1c of the slider are removed therefrom.

Therefore, because of a reduced overall size of the magnetic head H3 and the slider 1, the overall weight is reduced such that the magnetic head H3 is likely to float by an air stream on the disk D rotating at high speed.

In the rail 2, on the trailing side Y of the protruding rail portion 1d being integral with the slider 1, is formed a concave portion 1h which is generally orthogonally cut away to the slider, in which the core assembly 10a is fitted and cemented. In the rail 2, therefore, the ABS surface (a) is continuously formed by the protruding rail portion 1d and the core assembly 10a in the same width W, as in the aforementioned Embodiments.

In this magnetic head H3, since the concave portion 1h for containing the core assembly 10a is formed by cutting perpendicularly to the slider 1, machining of the slider 1 is easier than that in the case of the holding slot 1e shown in FIGS. 3 or 5. Assembling is also simple because the configuration is such that the core assembly 10a can be set to the side face of the slider 1 from the direction F1.

Similarly, assembling of the core assembly 20 which forms the rail 3 is also simple since the core assembly 20 can be set to the side face of the slider 1 to be fixed from the direction F2.

Figure 7A:
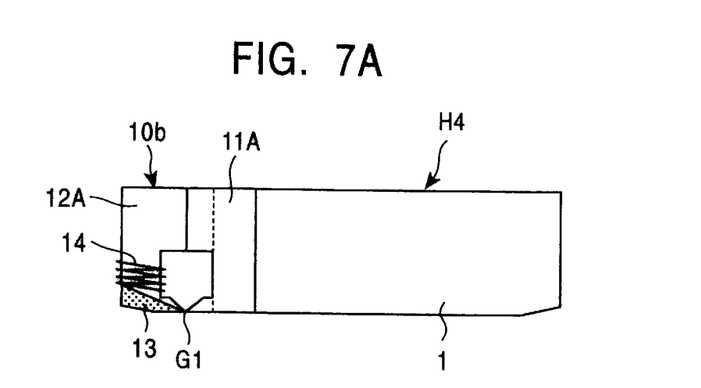
FIG. 7A is a side view of the magnetic head.
Figure 7B:
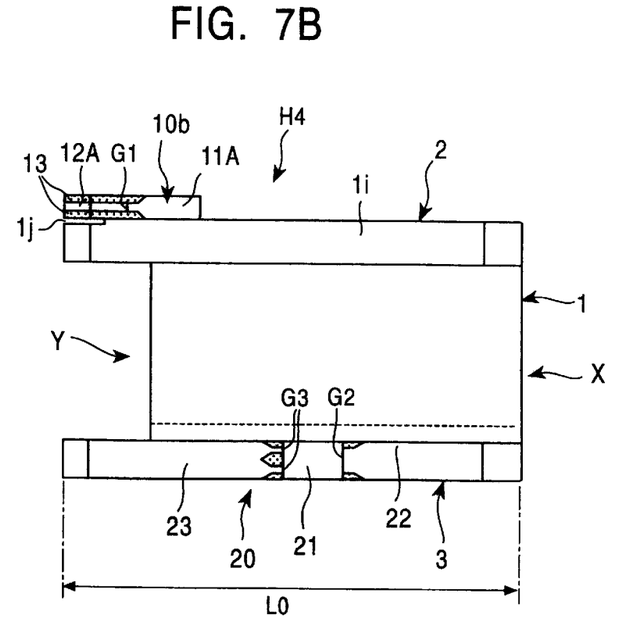
FIG. 7B is a bottom plan view.
Figure 7C:
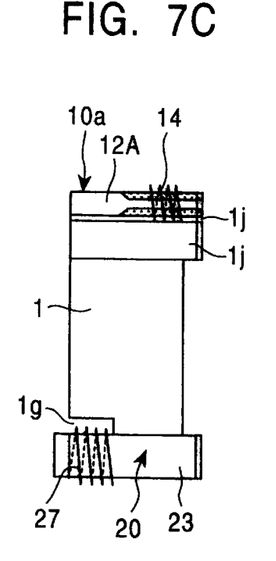
FIG. 7C is an end view at the trailing side.

FIGS. 7A to 7C illustrate another modified Embodiment of the Embodiment shown in FIGS. 6A and 6B. FIG. 7A is a side view; FIG. 7B is a bottom view; and FIG. 7c is an end view viewed from the trailing side Y.

A magnetic head H4, shown in FIGS. 7A to 7C, is formed so that the slider at one side of the rail 2 and that at one side of the rail 3 are cut off, similarly to that shown in FIGS. 6A and 6B. The arrangement of the core assembly 20 is the same as that in FIGS. 6A and 6B.

In the magnetic head H4 shown in FIGS. 7A to 7C, however, the rail 2 is formed by a protruding rail portion Ii along the entire length Lo. A thin core assembly 10b is attached to one side face of the protruding rail portion Ii on the trailing side Y.

The structure of the core assembly 10b is the same as that of FIG. 5 except for the width thereof is reduced. The magnetic gap G1 of a track-width Tw1, which is the equivalent of that in FIG. 3, is formed at the junction of the core half-portions of the core 11A and 12A. On the trailing side Y of the protruding rail portion Ii which forms the rail 2, a shallow depth concave portion 1j is formed to make space for the coil 14.

In this magnetic head H4, since it is not necessary to form a holding slot to set the core assembly and to form a concave portion or a difference in level in the slider 1, machining of the slider 1 is easy. Assembling is also simple because the configuration is such that the core assembly 10b can be fixed and cemented to the side face of the slider 1 from the side direction.

As mentioned above, according to the present invention, the machining of the slider for placing the core assembly is easy. When the core assembly is formed in the same width as that of the rail, the difference in level in the ABS surface around the magnetic gap is prevented to stabilize a floating position and to eliminate scratching on the disk.

When the core assembly is placed in the side face of the slider, it is not necessary to form a slot in the slider, and the assembling of the core assembly is also simple.

What is claimed is:

1. A magnetic head comprising:
   a slider;
   a rail extending in a scanning direction of a recording medium, formed in said slider;
   a core assembly formed by joining core half-portions which are the same width as that of said rail across a magnetic gap therebetween;
   an additional rail formed in said slider in parallel with said rail;
   an additional core assembly having a magnetic gap with a larger track width than a track width of said core assembly; and
   a coil which is placed on one of said core half-portions,
   wherein said core assembly is placed into said rail in a continuous position of said rail, a surface of said rail and surfaces of said core half-portions are continuous and have the same width, a track-width of the magnetic gap of said core assembly is smaller than the width of said rail, and at least a portion of the additional rail is formed by the additional core assembly.

2. A magnetic head according to claim 1, wherein the surfaces of said rails and the surfaces of said core half-portions are air bearing surfaces which receive an air stream on a recording medium.

3. A magnetic head comprising:
   a slider;
   a rail extending in a scanning direction of a recording medium, formed in a side of said slider;
   a core assembly formed by joining core half-portions across a magnetic gap therebetween;
   an additional rail formed in said slider in parallel with said rail;
   an additional core assembly having a magnetic gap with a larger track width than a track width of said core assembly; and
   a coil which is placed to one of said core half-portions,
   wherein said core assembly is placed into a side face of said rail, a surface of said rail and surfaces of said core half-portions are formed continuously with each other, said core half-portions of said core assembly are formed in the same width as that of said rail, a concave portion is formed in said slider by cutting a notch in said rail in a width direction, said core assembly is placed into said concave portion, the surface of said rail and the surfaces of said core half-portions are continuous and have the same width, a track width of the magnetic gap width of said core assembly is smaller than the width of said rail, and at least a portion of the additional rail is formed by the additional core assembly.

4. A magnetic head according to claim 3, wherein the surfaces of said rails and the surfaces of said core half-portions are air bearing surfaces which receive an air stream on a recording medium.

5. A magnetic head comprising:
   a slider;
   a rail extending in a scanning direction of a recording medium, formed in a side of said slider;
   a core assembly formed by joining core half-portions across a magnetic gap therebetween;
   a coil which is placed to one of said core half-portions;
   an additional rail formed in said slider in parallel with said rail; and
   an additional core assembly having a magnetic gap with a larger track width than a track width of said core assembly,
   wherein said core assembly is placed into a side face of said rail, a surface of said rail and surfaces of said core half-portions are formed continuously with each other, said core half-portions of said core assembly are formed in the same width as that of said rail, a concave portion is formed in said slider by cutting a notch in said rail in a width direction, said core assembly is placed into said concave portion, the surface of said rail and the surfaces of said core half-portions are continuous and have the same width, and at least a portion of said additional rail is formed by said additional core assembly.

6. A magnetic head according to claim 5, wherein the surfaces of said rails and the surfaces of said core half-portions are air bearing surfaces which receive an air stream on a recording medium.

7. A magnetic head comprising:
   a slider;
   a rail extending in a scanning direction of a recording medium, formed in a side of said slider;

a core assembly formed by joining core half-portions across a magnetic gap therebetween;

a coil which is placed to one of said core half-portions;

an additional rail formed in said slider in parallel with said rail; and an additional core assembly having a magnetic gap with a larger track width than a track width of said core assembly, wherein said core assembly is placed into a side face of said rail, a surface of said rail and surfaces of said core half-portions are formed continuously with each other, a track-width of the magnetic gap of said core assembly is smaller than the width of said rail, and at least a portion of said additional rail is formed by said additional core assembly.

8. A magnetic head according to claim 7, wherein the surfaces of said rails and the surfaces of said core half-portions are air bearing surfaces which receive an air stream on a recording medium.

9. A magnetic head comprising:

a slider;

a rail extending in a scanning direction of a recording medium, formed in a side of said slider;

a core assembly formed by joining core half-portions across a magnetic gap therebetween;

a coil which is placed to one of said core half-portions;

an additional rail formed in said slider in parallel with said rail; and an additional core assembly having a magnetic gap with a larger track width than a track width of said core assembly, wherein said core assembly is placed into a side face of said rail, a surface of said rail and surfaces of said core half-portions are formed continuously with each other, and at least a portion of said additional rail is formed by said additional core assembly.

10. A magnetic head according to claim 9, wherein the surfaces of said rails and the surfaces of said core half-portions are air bearing surfaces which receive an air stream on a recording medium.

11. A magnetic head comprising:

a slider;

a rail;

a core assembly having core half-portions formed in the same width as a width of said rail;

an additional rail formed in said slider in parallel with said rail; and an additional core assembly having a magnetic gap with a larger track width than a track width of said core assembly, wherein in said slider a concave portion is formed by cutting a notch in said rail in a width direction, said core assembly is placed into said concave portion, a surface of said rail and surfaces of said core half-portions are continuous and have the same width, and at least a portion of said additional rail is formed by said additional core assembly.

12. A magnetic head comprising:

a slider;

a rail extending in the scanning direction of a recording medium, formed in said slider;

a core assembly formed by joining core half-portions which are the same width as that of said rail across a magnetic gap therebetween;

an additional rail formed in said slider in parallel with said rail;

an additional core assembly having a magnetic gap with a larger track width than a track width of said core assembly; and a coil which is placed on one of said core half-portions, wherein said core assembly is placed into said rail in a continuous position of said rail, a surface of said rail and surfaces of said core half-portions are continuous and have the same width, a track width of the magnetic gap of the additional core assembly is larger than that of said core assembly, and at least a portion of the additional rail is formed by the additional core assembly.

13. A magnetic head according to claim 12, wherein the surfaces of said rails and the surfaces of said core half-portions are air bearing surfaces which receive an air stream on a recording medium.

14. A magnetic head comprising:

a slider;

a rail;

a core assembly having core half-portions formed in the same width as a width of said rail;

an additional rail formed in said slider in parallel with said rail; and an additional core assembly having a magnetic gap with a larger track width than a track width of said core assembly, wherein in said slider a concave portion is formed by cutting a notch in said rail in a width direction, a track-width of the magnetic gap of said core assembly is smaller than the width of said rail, said core assembly is placed into said concave portion, a surface of said rail and surfaces of said core half-portions are continuous and have the same width, and at least a portion of said additional rail is formed by said additional core assembly.

15. A magnetic head according to claim 14, wherein the surfaces of said rails and the surfaces of said core half-portions are air bearing surfaces which receive an air stream on a recording medium.

* * * * *